United States Patent
Tian et al.

(10) Patent No.: US 8,593,764 B1
(45) Date of Patent: Nov. 26, 2013

(54) METHOD FOR FINE ACTUATION OF A HEAD DURING OPERATION OF A DISK DRIVE

(71) Applicant: Western Digital Technologies, Inc., Irvine, CA (US)

(72) Inventors: Jifang Tian, Fremont, CA (US); Qiang Yang, Fremont, CA (US); Jian Yang, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/672,636

(22) Filed: Nov. 8, 2012

Related U.S. Application Data (63) Continuation-in-part of application No. 13/626,846, filed on Sep. 25, 2012, which is a continuation-in-part of application No. 13/159,598, filed on Jun. 14, 2011, now Pat. No. 8,295,012.

(51) Int. Cl.
*G11B 5/127* (2006.01)

(52) U.S. Cl.
USPC ........................................... 360/245.4

(58) Field of Classification Search
USPC ............... 360/245.4, 234.5, 294, 294.4, 245, 360/245.7, 245.9, 244.2, 245.2, 244.3, 360/234.6, 244.5
See application file for complete search history.

(56) References Cited

U.S. PATENT DOCUMENTS

| | | | |
|---|---|---|---|
| 4,945,438 A | 7/1990 | Matsumoto et al. | |
| 5,465,186 A | 11/1995 | Bajorek et al. | |
| 5,894,651 A | 4/1999 | Dvorsky et al. | |
| 5,898,541 A | 4/1999 | Boutaghou et al. | |
| 5,920,145 A | 7/1999 | Wu et al. | |
| 5,920,978 A | 7/1999 | Koshikawa et al. | |
| 6,052,879 A | 4/2000 | Wu et al. | |
| 6,262,869 B1 | 7/2001 | Lin et al. | |
| 6,291,930 B1 | 9/2001 | Sager | |
| 6,297,936 B1 * | 10/2001 | Kant et al. | 360/294.4 |
| 6,320,730 B1 | 11/2001 | Stefansky et al. | |
| 6,351,352 B1 | 2/2002 | Khan et al. | |
| 6,351,353 B1 | 2/2002 | Sluzewski et al. | |
| 6,351,354 B1 | 2/2002 | Bonin | |
| 6,421,211 B1 | 7/2002 | Hawwa et al. | |
| 6,487,045 B1 | 11/2002 | Yanagisawa | |
| 6,501,625 B1 | 12/2002 | Boismier et al. | |
| 6,570,730 B1 | 5/2003 | Lewis et al. | |
| 6,624,984 B2 | 9/2003 | Lewis et al. | |

(Continued)

OTHER PUBLICATIONS

Kuwajima et al., "Thin-Film Piezoelectric DSA for HDD", IEEE Trans. Magn., vol. 38, No. 5, Sep. 2002, pp. 2186-2188.

(Continued)

*Primary Examiner* — Allen T Cao (57) ABSTRACT

A disk drive includes a voice coil actuator, and a rotary fine actuator that is attached to the head mounting tongue of the flexure of a suspension assembly. The head is positioned during operation of the disk drive by a novel method. An electrical current is driven through a coil of the voice coil actuator to torque it towards a desired coarse position. First and second voltages are applied across first and second piezoelectric elements attached to the flexure, respectively. The first and second voltages cause longitudinal deformation of the first and second piezoelectric elements, respectively, the longitudinal deformation consisting of expansion relative to a zero-voltage state. The first and second voltages do not switch polarity during normal operation of the first and second piezoelectric elements.

11 Claims, 7 Drawing Sheets

(56) References Cited

U.S. PATENT DOCUMENTS

| | | |
|---|---|---|
| 6,661,619 B2 | 12/2003 | Nishida et al. |
| 6,738,231 B2 | 5/2004 | Arya et al. |
| 6,760,196 B1 | 7/2004 | Niu et al. |
| 6,807,030 B1 | 10/2004 | Hawwa et al. |
| 6,870,709 B2 | 3/2005 | Shimanouchi et al. |
| 6,883,215 B2 | 4/2005 | Takeuchi et al. |
| 6,928,722 B2 | 8/2005 | Yanagisawa |
| 6,961,221 B1 | 11/2005 | Niu et al. |
| 7,023,663 B2 | 4/2006 | Yao et al. |
| 7,050,270 B1 * | 5/2006 | Oveyssi et al. ............... 360/266 |
| 7,057,857 B1 | 6/2006 | Niu et al. |
| 7,057,858 B2 | 6/2006 | Pan et al. |
| 7,072,149 B2 | 7/2006 | Kuwajima et al. |
| 7,082,671 B2 | 8/2006 | Yanagisawa |
| 7,151,650 B2 | 12/2006 | Lee |
| 7,159,300 B2 | 1/2007 | Yao et al. |
| 7,248,444 B1 | 7/2007 | Lauer |
| 7,277,257 B2 | 10/2007 | Hipwell, Jr. et al. |
| 7,280,319 B1 | 10/2007 | McNab |
| 7,301,731 B2 | 11/2007 | Mita et al. |
| 7,312,941 B2 | 12/2007 | Hirano et al. |
| 7,345,851 B2 | 3/2008 | Hirano et al. |
| 7,352,538 B2 | 4/2008 | Kurihara et al. |
| 7,382,583 B2 | 6/2008 | Hirano et al. |
| 7,391,590 B2 | 6/2008 | Matono et al. |
| 7,417,831 B2 | 8/2008 | Yao et al. |
| 7,420,785 B2 | 9/2008 | Yamazaki et al. |
| 7,466,520 B2 | 12/2008 | White et al. |
| 7,471,490 B2 | 12/2008 | Yao |
| 7,474,512 B2 | 1/2009 | Yao et al. |
| 7,525,769 B2 | 4/2009 | Yao et al. |
| 7,535,680 B2 | 5/2009 | Yao et al. |
| 7,538,984 B2 | 5/2009 | Yao |
| 7,567,019 B2 | 7/2009 | Yamanaka et al. |
| 7,609,487 B2 | 10/2009 | Yao et al. |
| 7,612,963 B2 | 11/2009 | Allen et al. |
| 7,663,843 B2 | 2/2010 | Yao |
| 7,684,158 B1 | 3/2010 | Lauer |
| 7,701,675 B2 | 4/2010 | Yao et al. |
| 7,719,798 B2 | 5/2010 | Yao |
| 7,733,607 B2 | 6/2010 | Yao et al. |
| 7,916,427 B1 | 3/2011 | Lauer |
| 8,015,692 B1 | 9/2011 | Zhang et al. |
| 8,111,487 B2 | 2/2012 | Lauer |
| 8,264,797 B2 | 9/2012 | Emley |
| 8,295,012 B1 | 10/2012 | Tian et al. |
| 8,446,694 B1 | 5/2013 | Tian et al. |
| 2002/0191342 A1 | 12/2002 | Yanagisawa |
| 2007/0223144 A1 | 9/2007 | Yao et al. |
| 2007/0291419 A1 | 12/2007 | Lee et al. |
| 2008/0024933 A1 | 1/2008 | Yao et al. |
| 2008/0030905 A1 | 2/2008 | Yamanaka et al. |
| 2008/0198511 A1 | 8/2008 | Hirano et al. |
| 2009/0021857 A1 | 1/2009 | Shelor |
| 2009/0034128 A1 * | 2/2009 | Sharma et al. ............. 360/294.4 |
| 2011/0116192 A1 | 5/2011 | Fujita et al. |
| 2011/0149439 A1 | 6/2011 | Emley |
| 2011/0176242 A1 | 7/2011 | Lauer |
| 2011/0228425 A1 * | 9/2011 | Liu et al. .................... 360/244.2 |
| 2012/0242191 A1 * | 9/2012 | Aimono ....................... 310/317 |

OTHER PUBLICATIONS

Oldham et al., "Thin-Film PZT Lateral Actuators With Extended Stroke", Journal of Microelectromechanical Systems, vol. 17, No. 4, Aug. 2008, pp. 890-899.

SEO et al., "Laterally driven thin film PZT actuator with high-aspect-ratio silicon beam for stroke amplification", Sensors and Actuators A, vol. 127 (2006), pp. 302-309.

Notice of Allowance dated Jun. 22, 2012 from U.S. Appl. No. 13/159,598, 10 pages.

Notice of Allowance dated Jan. 25, 2013 from U.S. Appl. No. 13/626,846, 19 pages.

* cited by examiner

```
Driving an electrical current through an actuator coil to move
a voice coil actuator towards a desired coarse position.
```
⎿ 712

```
Applying a first voltage across a first piezoelectric element attached to
the flexure, the first voltage causing a longitudinal deformation of the
first piezoelectric element consisting of expansion relative to a zero-
voltage state, wherein the first voltage does not switch polarity during
normal operation of the first piezoelectric element.
```
⎿ 714

```
Applying a second voltage across a second piezoelectric element
attached to the flexure, the second voltage causing a longitudinal
deformation of the second piezoelectric element consisting of expansion
relative to a zero-voltage state, wherein the first voltage does not switch
polarity during normal operation of the first piezoelectric element.
```
⎿ 716

FIG . 7

METHOD FOR FINE ACTUATION OF A HEAD DURING OPERATION OF A DISK DRIVE

CROSS-REFERENCE TO RELATED APPLICATIONS

This application claims benefit under 35 U.S.C. §120 as a continuation-in-part of pending U.S. patent application Ser. No. 13/626,846, filed Sep. 25, 2012, which is a continuation-in-part of U.S. patent application Ser. No. 13/159,598, filed Jun. 14, 2011, now U.S. Pat. No. 8,295,012 granted Oct. 23, 2012, both of which are hereby incorporated by reference in their entirety.

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write. For convenience, all heads that can read are referred to as "read heads" herein, regardless of other devices or functions that the read head may also include or perform (e.g. writing, flying height control, touch down detection, lapping control, etc).

In a modern magnetic hard disk drive device, each read head is a sub-component of a head gimbal assembly (HGA). The read head typically includes a slider and a read/write transducer. The read/write transducer typically comprises a magneto-resistive read element (e.g. so-called giant magneto-resistive read element, or a tunneling magneto-resistive read element) and an inductive write structure comprising a flat coil deposited by photolithography and a yoke structure having pole tips that face a disk media.

The HGA typically also includes a head suspension assembly that includes a mounting plate, a load beam, and a laminated flexure to carry the electrical signals to and from the read head. The read head is typically bonded to a tongue feature of the laminated flexure. The HGA, in turn, is a sub-component of a head stack assembly (HSA) that typically includes a plurality of HGAs, a rotary actuator, and a flex cable. The mounting plate of each head suspension assembly is attached to an arm of the rotary actuator (e.g. by swaging), and each of the laminated flexures includes a flexure tail that is electrically connected to the HSA's flex cable (e.g. by solder reflow bonding or ultrasonic bonding).

Modern laminated flexures typically include electrically conductive copper traces that are isolated from a stainless steel support layer by a polyimide dielectric layer. So that the signals from/to the head can reach the flex cable on the actuator body, each HGA flexure includes a flexure tail that extends away from the head along the actuator arm and ultimately attaches to the flex cable adjacent the actuator body. That is, the flexure includes electrically conductive traces that are electrically connected to a plurality of electrically conductive bonding pads on the head (e.g. by gold ball bonding), and extend from adjacent the head to terminate at electrical connection points at the flexure tail.

The position of the HSA relative to the spinning disks in a disk drive, and therefore the position of the read heads relative to data tracks on the disks, is actively controlled by the rotary actuator which is typically driven by a voice coil motor (VCM). Specifically, electrical current passed through a coil of the VCM applies a torque to the rotary actuator, so that the read head can seek and follow desired data tracks on the spinning disk.

However, the industry trend towards increasing areal data density has necessitated substantial reduction in the spacing between data tracks on the disk. Also, disk drive performance requirements, especially requirements pertaining to the time required to access desired data, have not allowed the rotational speed of the disk to be reduced. In fact, for many disk drive applications, the rotational speed has been significantly increased. A consequence of these trends is that increased bandwidth is required for servo control of the read head position relative to data tracks on the spinning disk.

One solution that has been proposed in the art to increase disk drive servo bandwidth is dual-stage actuation. Under the dual-stage actuation concept, the rotary actuator that is driven by the VCM is employed as a coarse actuator (for large adjustments in the HSA position relative to the disk), while a so-called "microactuator" having higher bandwidth but lesser stroke is used as a fine actuator (for smaller adjustments in the read head position). Such a coarse actuator driven by a VCM may be referred to as a voice coil actuator herein. Various microactuator designs have been proposed in the art for the purpose of dual-stage actuation in disk drive applications. Some of these designs utilize one or more piezoelectric microactuators that are affixed to a component of the suspension assembly. For example, the piezoelectric microactuator may be affixed to the mounting plate or an extension thereof, and/or the load beam or an extension thereof, or to the flexure tongue (a.k.a. the "gimbal tongue") to which the read head is bonded.

However, generally, the further the microactuator is disposed from the read head on the suspension assembly, the less bandwidth it can provide. This is due to the dynamics introduced by the intermediate structure of the suspension assembly. On the other hand, the closer the microactuator is disposed to the read head on the suspension assembly, the lesser stroke it can typically provide. Hence there is a need in the information storage device arts for a microactuator design that can provide both adequate stroke and adequate bandwidth for fine actuation.

Moreover, prior art concepts require the piezoelectric elements to expand (relative to a zero voltage state) to move or rotate the head in a given direction or sense, and to contract (relative to a zero voltage state) to move or rotate the head in the opposite direction or sense. This may undesirably cause depolarization of the piezoelectric elements over time, reducing their effectiveness, stroke, and/or bandwidth. Hence, there is a need in the information storage device arts for a fine actuation method that reduces or eliminates depolarization of piezoelectric sub-components, thereby improving the lifetime or reliability of the fine actuator.

DETAILED DESCRIPTION OF EXEMPLARY EMBODIMENTS

Figure 1:
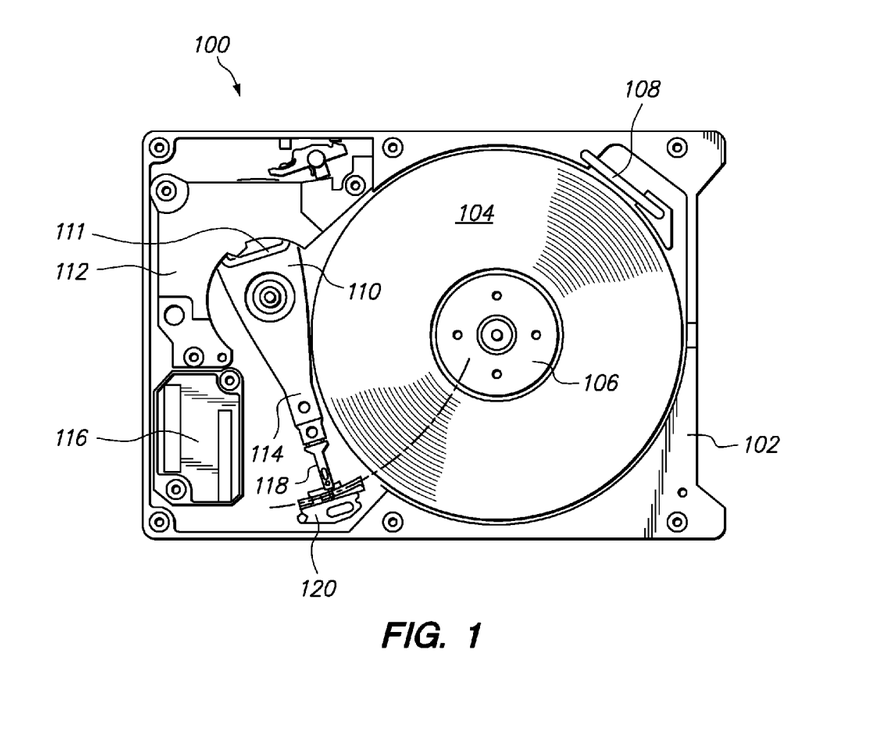
FIG. 1 is top view of a disk drive capable of operation according to an embodiment of the present invention.

FIG. 1 is top view of a disk drive 100 that is capable of operation according to an embodiment of the present invention. The disk drive 100 includes a disk drive base 102. The disk drive 100 further includes a spindle 106, rotably mounted on the disk drive base 102, for rotating at least one disk 104 that is mounted on the spindle 106. The rotation of the disk(s) 104 establishes air flow through optional recirculation filter 108. In certain embodiments, disk drive 100 may have only a single disk 104, or alternatively, two or more disks.

The disk drive 100 further includes a voice coil actuator 110 that is rotably mounted on disk drive base 102. The voice coil actuator 110 includes an actuator arm 114 that supports a head gimbal assembly (HGA) 118. The voice coil actuator 110 also includes an actuator coil 111, positioned within the field of a permanent magnet 112 to form a voice coil motor (VCM). During disk drive operation, an electrical current may be driven through the actuator coil 111 to move the voice coil actuator 110 through a limited angular range, towards a desired coarse position (e.g. angular position). For example, the HGA 118 may thereby be desirably coarsely positioned relative to one or more tracks of information on the disk 104. Preferably the disk drive 100 will include one HGA 118 per disk surface, but depopulated disk drives are also contemplated in which fewer HGAs are used. Under non-operating conditions the HGA(s) 118 may be parked on ramp 120, for example to avoid contact with the disk 104 when it is not spinning. Electrical signals to/from the HGA 118 are carried to other drive electronics, in part via a flex cable (not shown) and a flex cable bracket 116.

Figure 2A:
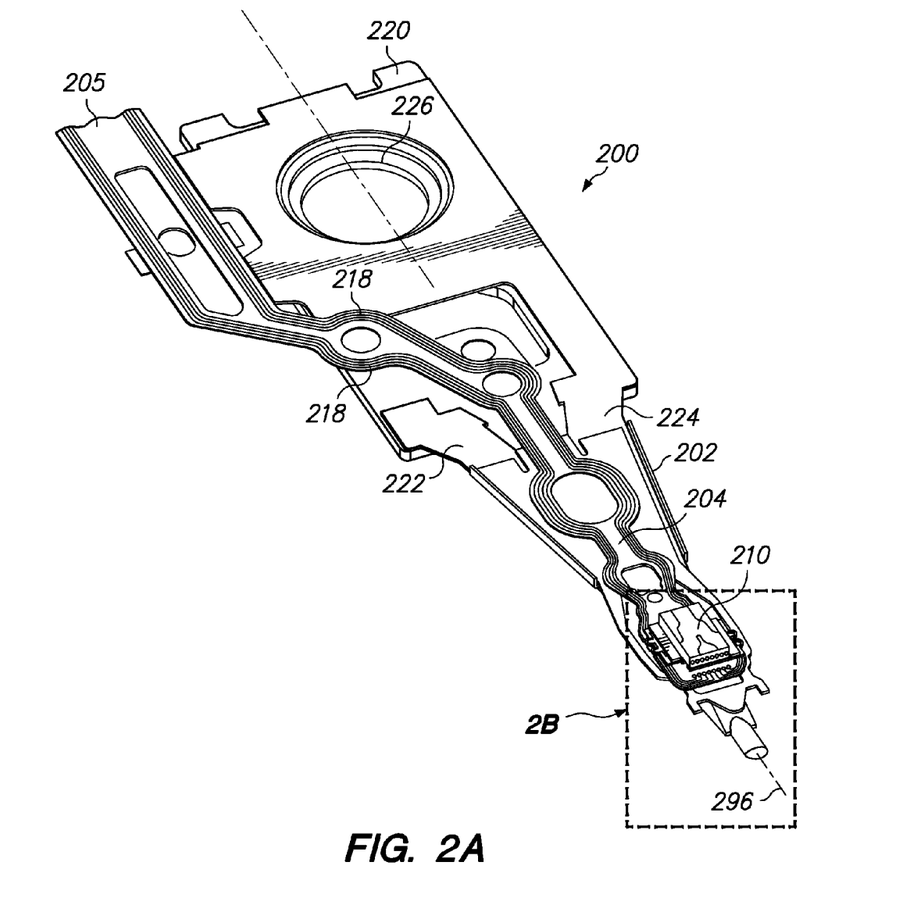
FIG. 2A is a bottom perspective view of a head gimbal assembly (HGA) capable of operation according to an embodiment of the present invention.
Figure 2B:
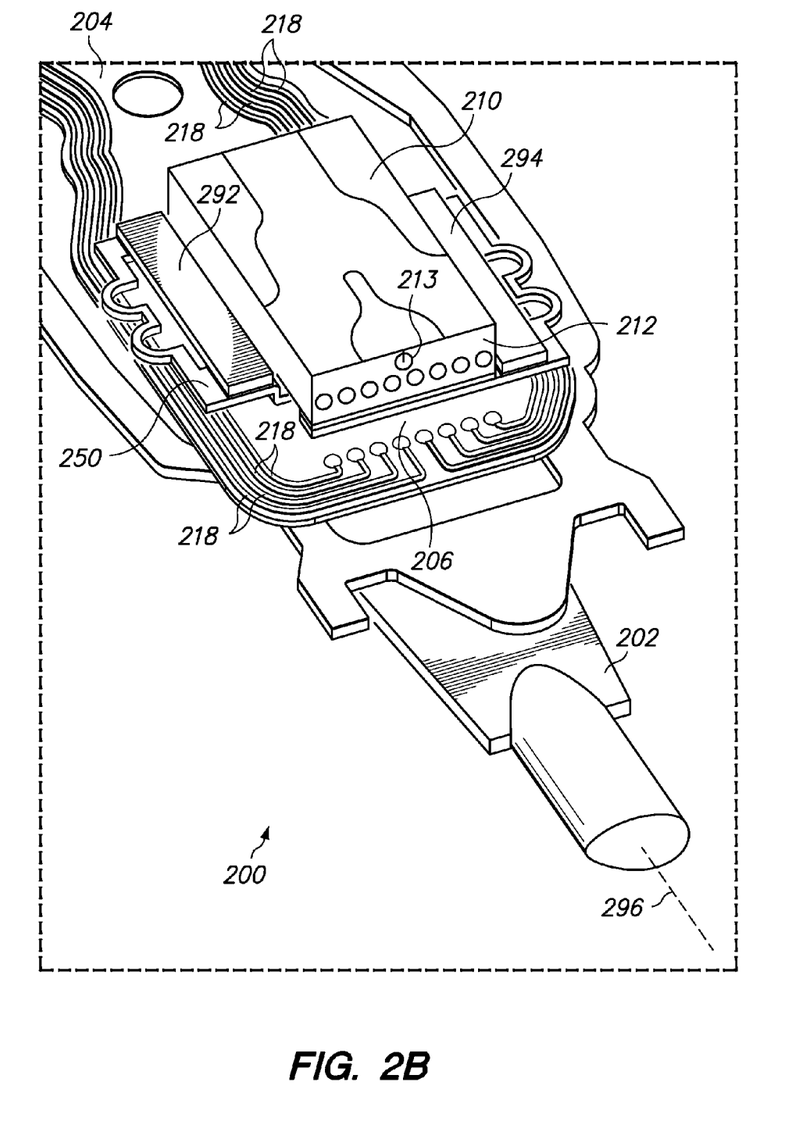
FIG. 2B is an expanded view of a portion of the HGA of FIG. 2A.

FIG. 2A is a bottom perspective view of an HGA 200 capable of operation according to an embodiment of the present invention. FIG. 2B is an expanded view of a portion of the HGA 200. Now referring additionally to FIGS. 2A and 2B, the HGA 200 includes a load beam 202 that defines a load beam longitudinal axis 296, and a read head 210 for reading and writing data from and to a magnetic disk (e.g. disk 104). The read head 210 includes a slider substrate having an air bearing surface (the label 210 points to this surface) and an opposing top surface (not visible in the view of FIG. 2A). The slider substrate preferably comprises AlTiC, although another ceramic or silicon might also be used. The slider substrate of the read head 210 also includes a trailing face 212 that includes a read/write transducer 213. In certain embodiments, the read/write transducer 213 is preferably an inductive magnetic write transducer merged with a magneto-resistive read transducer (e.g. a tunneling magneto-resistive read transducer). A purpose of the load beam 202 is to provide limited vertical compliance for the read head 210 to follow vertical undulations of the surface of a disk (e.g. disk 104) as it rotates, and to preload the air bearing surface of the read head 210 against the disk surface by a preload force that is commonly referred to as the "gram load."

In the embodiment of FIGS. 2A and 2B, the HGA 200 also includes a laminated flexure 204 attached to the load beam 202. The laminated flexure 204 includes a head mounting tongue 206 that has a read head bonding surface. The read head 210 is attached to the head mounting tongue 206 of the laminated flexure 204. Only a portion of the head mounting tongue 206 is visible in the view of FIGS. 2A and 2B because the read head 210 (and other components of the HGA 200 that will be subsequently described) partially obscures it. A first purpose of the laminated flexure 204 is to provide compliance for the read head 210 to follow pitch and roll angular undulations of the surface of the disk (e.g. disk 104) as it rotates, while restricting relative motion between the read head 210 and the load beam 202 in the lateral direction and about a yaw axis.

A second purpose of the laminated flexure 204 may be to provide a plurality of electrical paths to facilitate signal transmission to/from the read head 210. For that second purpose, the laminated flexure 204 includes a plurality of electrically conductive traces 218 that are defined in an electrically conductive (e.g. copper) sub-layer of the laminated flexure 204. Electrically conductive traces 218 are insulated from a support layer (e.g. stainless steel) by a dielectric layer (e.g. polyimide). The electrically conductive traces 218 may extend away from the read head 210 along a flexure tail 205 of the laminated flexure 204, to reach a portion of the flex cable (not shown) that includes a preamplifier chip near the body of the actuator (e.g. actuator 110).

In the embodiment of FIGS. 2A and 2B, the load beam 202 includes hinge plates 222 and 224, and is attached to a mounting plate 220 via the hinge plates 222 and 224. These components may be made of stainless steel, and their attachments to each other may be made by a plurality of spot welds, for example. Alternatively, the load beam 202 may have integral hinge plate regions rather than being assembled with separate hinge plate components, so that the load beam 202 and its hinge plates would be a single component having material continuity.

The load beam 202 with its hinge plates 222, 224 (if any), and the mounting plate 220, may together be referred to as a "suspension assembly." Accordingly, the mounting plate 220 may also be referred to as a suspension assembly mounting plate 220. In certain preferred embodiments, the suspension assembly mounting plate 220 includes a swage boss 226 to facilitate attachment of the suspension assembly to an actuator arm (e.g. actuator arm 114) by a swage connection. In that case, the suspension assembly mounting plate 220 may also be referred to as a "swage mounting plate." Note that, after the laminated flexure 204 is attached to the load beam 202, the laminated flexure 204 may be considered to also pertain to the "suspension assembly." However, before the laminated flexure 204 is attached to the load beam 202, the term "suspension assembly" may refer to only the load beam 202 with its hinge plates 222, 224 (if any), and the mounting plate 220.

In the embodiment of FIGS. 2A and 2B, the HGA 200 is depicted to also include a rotary fine actuator 250 according to an embodiment of the present invention, attached to the head mounting tongue 206. The rotary fine actuator 250 does not move the head mounting tongue 206, but rather moves the read head 210 with respect to the head mounting tongue 206, because fine rotary actuator 250 is between the head mounting tongue 206 and the read head 210. The rotary fine actuator 250 may include first and second piezoelectric elements 292, 294. The read head 210 may be electrically connected to more than one of the plurality of conductive traces 218, and the first and second piezoelectric elements 292, 294 may be each electrically connected to at least one of the plurality of conductive traces 218.

Figure 3:
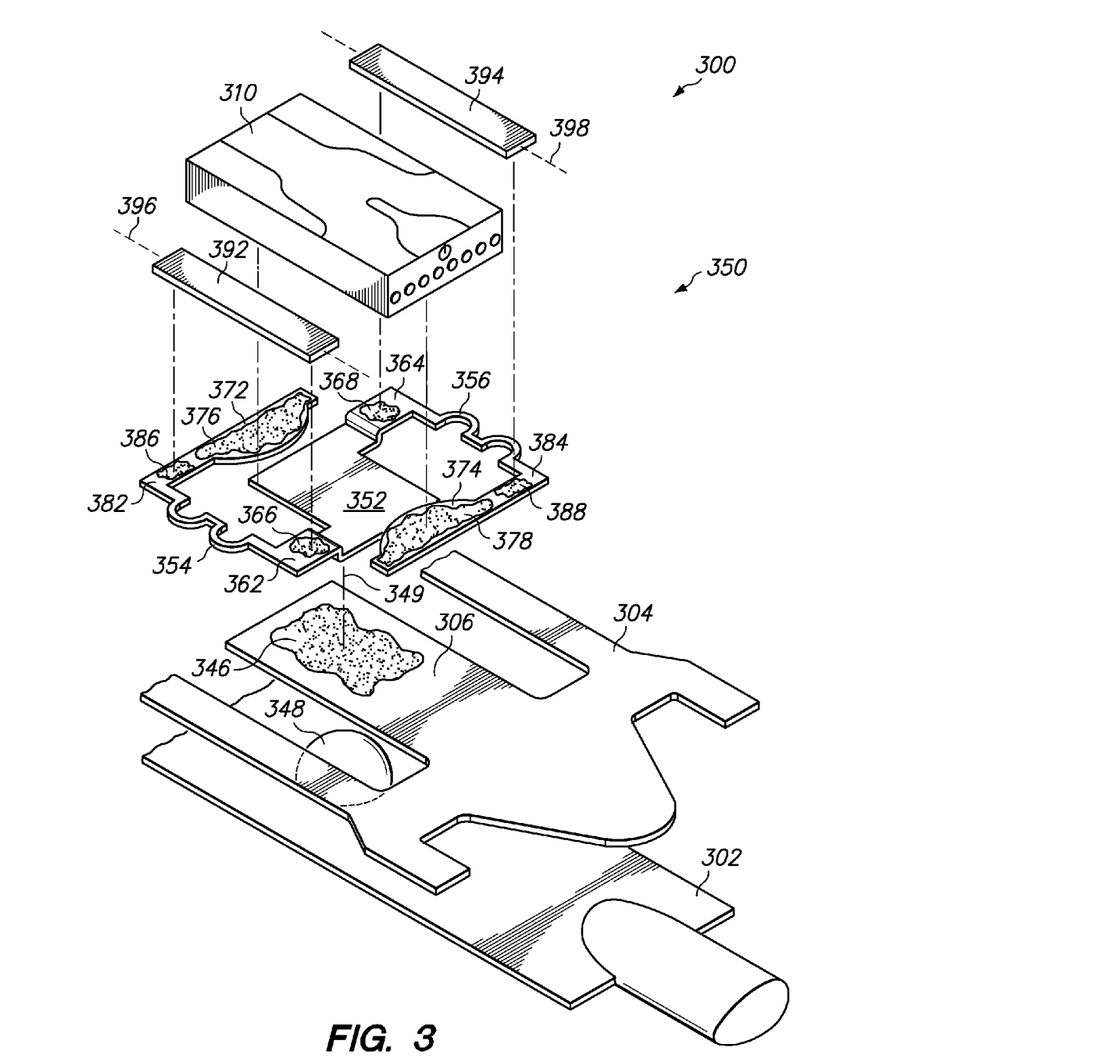
FIG. 3 is a bottom exploded perspective view of several rotary fine actuator components of an HGA capable of operation according to an embodiment of the present invention.
Figure 4:
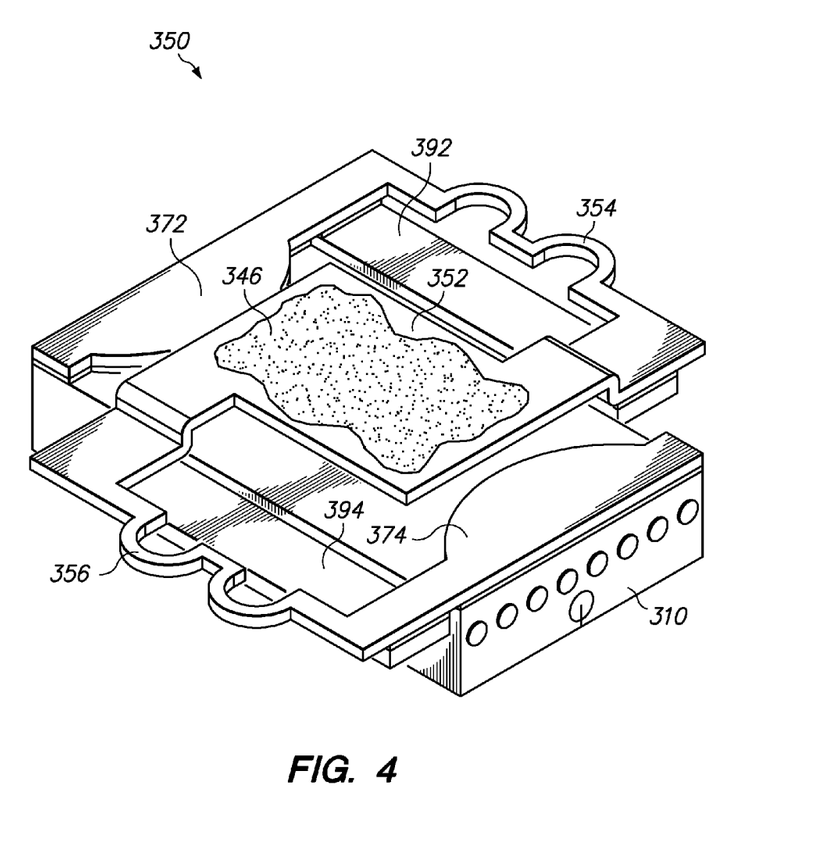
FIG. 4 is a top perspective assembled view of the rotary fine actuator components of FIG. 3.

FIG. 3 is a bottom exploded perspective view of several components of a rotary fine actuator 350 of an HGA 300 capable of operation according to an embodiment of the present invention. FIG. 4 is a top perspective assembled view of those rotary fine actuator components. Now referring to FIGS. 3 and 4, the HGA 300 includes a load beam 302, and a laminated flexure 304 (only the structural layer of the flexure is shown in FIG. 3; the conventional dielectric layer, and the conventional traces of the conductive layer of the laminated flexure 304 are not shown, so that certain novel features of the rotary fine actuator 350 can be seen more clearly).

In the embodiment of FIGS. 3 and 4, the rotary fine actuator 350 of HGA 300 includes a fixed portion 352 having a first bonding surface 362, and a two-part head mounting platform 372, 374 that includes a second bonding surface 382. A read head 310 is adhered to the two-part head mounting platform 372, 374 by adhesive material 376, 378 (e.g. conventional epoxy, cyanoacrylate, etc). The rotary fine actuator 350 also includes a first piezoelectric element 392 defining a first element longitudinal axis 396 that is approximately parallel to the load beam longitudinal axis (e.g. load beam longitudinal axis 296 of FIGS. 2A and 2B). Since perfect parallelism is not practical to achieve when fabricating such small structures, the term parallel, as used herein, shall mean within ±10 degrees of perfect parallelism.

Referring again to the embodiment of FIGS. 3 and 4, a first end of the first piezoelectric element 392 is bonded to the first bonding surface 362 by a bonding material 366. A second end of the first piezoelectric element 392 is bonded to the second bonding surface 382 by a bonding material 386. The rotary fine actuator 350 also includes a second piezoelectric element 394 extending between the fixed portion 352 and the two-part head mounting platform 372, 374. The second piezoelectric element 394 defines a second element longitudinal axis 398 that is parallel to the load beam longitudinal axis (e.g. load beam longitudinal axis 296 of FIGS. 2A and 2B).

Referring again to the embodiment of FIGS. 3 and 4, the fixed portion 352 may include a third bonding surface 364, and the two-part head mounting platform 372, 374 may include a fourth bonding surface 384. A first end of the second piezoelectric element 394 may be bonded to the third bonding surface 364 by a bonding material 368. A second end of the second piezoelectric element 394 may be bonded to the fourth bonding surface 384 by a bonding material 388. In certain embodiments, conductive adhesive, solder, ribbon leads, and/or gold wire stitching may be used to make conventional electrical connections to the piezoelectric elements 392, 394. However, if solder is used, then it may be desirable for the solder to have a low temp-melting-point since it should not need to get so hot that the piezoelectric material (e.g. PZT) would become depolarized.

In certain embodiments, a side of each piezoelectric element 392, 394 may be grounded via electrical conduction through the head mounting platform 372, 374, the fixed portion 352, and the stainless steel parts of the suspension assembly (used as the ground conductor rather than or in addition to a ground trace of the laminated flexure). In certain embodiments, the head mounting platform 372, 374, and the fixed portion 352 are preferably fabricated from a metal material (e.g. stainless steel). The bonding materials 366, 368, 386, 388 may include conventional adhesive (e.g. UV cured epoxy, thermal set epoxy, epoxy doped with an electrically conductive filler, etc) or conventional solder materials, for example.

In the embodiment of FIGS. 3 and 4, the rotary fine actuator 350 includes a first curved compliant member 354 extending between the first bonding surface 362 of the fixed portion 352 and the second bonding surface 382 of the head mounting platform 372, 374. The rotary fine actuator 350 also includes a second curved compliant member 356 extending between the third bonding surface 364 of the fixed portion 352 and the fourth bonding surface 384 of the head mounting platform 372, 374. In certain embodiments, the curvature of the first and second compliant members 354, 356 may enhance their compliance for elongation in a direction parallel to the element longitudinal axis 396.

In the embodiment of FIGS. 3 and 4, the fixed portion 352, the head mounting platform 372, 374, and the first and second curved compliant members 354, 356 are a single component having material continuity rather than being an assembly of sub-components. For example, the fixed portion 352, the head mounting platform 372, 374, and the first and second curved compliant members 354, 356 may be distinct regions of a single stainless steel sheet, each distinct region being at least partially bounded and defined by etched openings through the single stainless steel sheet. In the embodiment of FIGS. 3 and 4, such single component is bonded to the head mounting tongue 306 by a bonding material 346 (e.g. an adhesive such as an epoxy adhesive). The load beam 302 optionally includes a dimple 348 (e.g. a hemispherical dimple) that protrudes upwards towards the read head 310, and contacts the head mounting tongue 306 at a dimple contact location. The rotary fine actuator 350 preferably rotates the read head 310 about a fine actuator axis of rotation 349 that passes through the dimple contact location.

However, in an alternative embodiment, the fixed portion 352 is fabricated from the head mounting tongue 306 so that it is a region of the head mounting tongue 306. In that case, the head mounting tongue 306, the fixed portion 352, the head mounting platform 372, 374, and the first and second curved compliant members 354, 356 would be a single component having material continuity rather than being an assembly of sub-components. For example, the head mounting tongue 306, the fixed portion 352, the head mounting platform 372, 374, and the first and second curved compliant members 354, 356 may be distinct regions of a single stainless steel sheet, each distinct region being at least partially bounded and defined by etched openings through the single stainless steel sheet. In this alternative embodiment, the dimple 348 may contact the fixed portion 352, or pass through an opening in the fixed portion 352 to contact the read head 310 directly at a dimple contact location. Alignment of the fine actuator axis of rotation 349 with the dimple contact location may advantageously reduce or eliminate undesired stick-slip relative motion between the dimple 348 and rotating parts during operation.

In the embodiment of FIGS. 3 and 4, a read head 310 is bonded to the head mounting platform 372, 374, at mounting surfaces thereof that are approximately parallel to the first, second, third, and fourth bonding surfaces 362, 382, 364, 384. Again in this context, since perfect parallelism is not practical to achieve when fabricating such small structures, the term "parallel" shall mean within ±10 degrees of perfect parallelism. As shown in FIG. 4, the read head 310 is disposed between the first and second piezoelectric elements 392, 394, and the first and second piezoelectric elements 392, 394 are disposed closer to the read head 310 than are the first and second curved compliant members 354, 356. For example, the first and second piezoelectric elements 392, 394 may be disposed between the first and second curved compliant members 354, 356, as viewed from above or below the HGA 300 along the fine actuator axis of rotation 349. Also, in the embodiment of FIGS. 3 and 4, the first and second piezoelectric elements 392, 394 are preferably disposed on the same side of a plane that passes through the mounting surfaces of the head mounting platform 372, 374, as is the read head 310.

Figure 5:
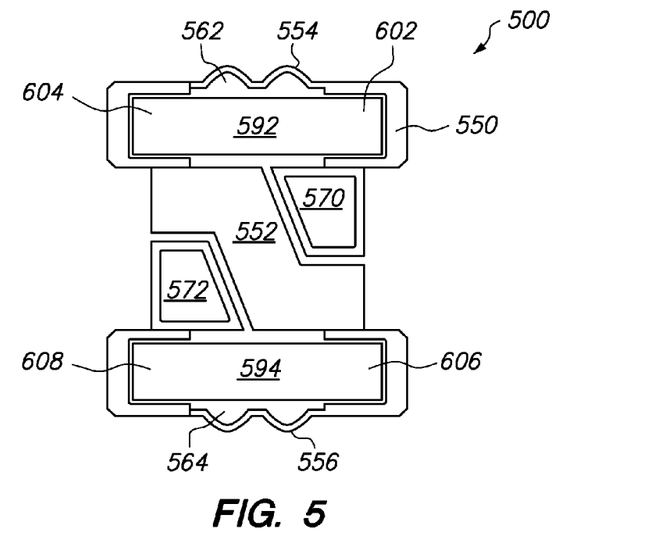
FIG. 5 is a plan view of a fine rotary actuator capable of operation according to an embodiment of the present invention.
Figure 6:
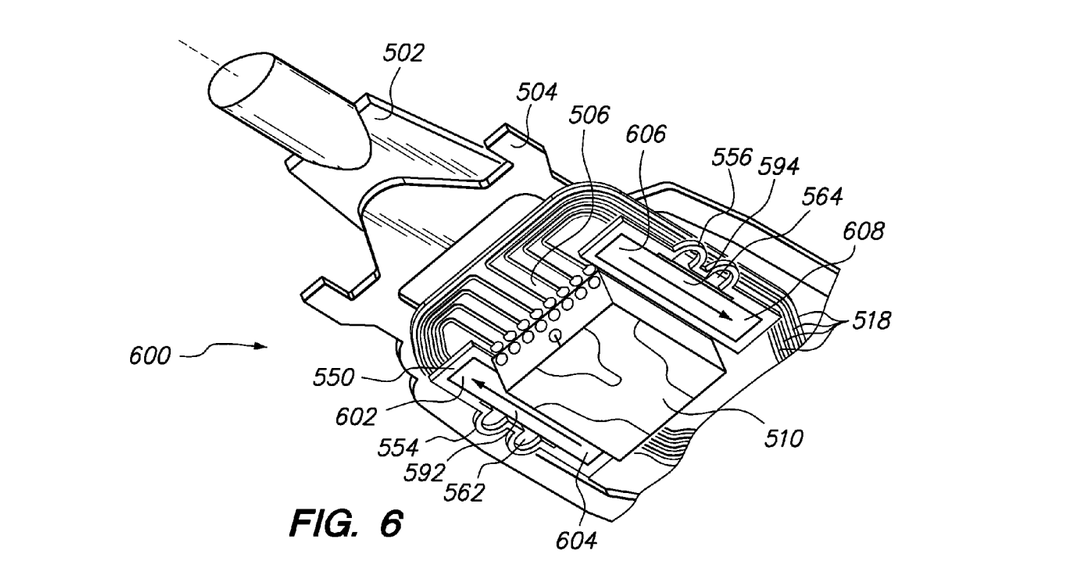
FIG. 6 is a bottom perspective view of a fine rotary actuator attached to a flexure of a head suspension assembly, with arrows designating piezoelectric element expansion (relative to a zero-voltage state) during operation of the rotary fine actuator according to an embodiment of the present invention.

FIG. 5 is a plan view of a fine rotary head actuator 500 capable of operation according to an embodiment of the present invention. FIG. 6 is a bottom perspective view of the fine rotary head actuator 500 as attached to a head suspension assembly 600, with arrows designating piezoelectric element expansion directions (relative to a zero-voltage state) during operation of the rotary fine actuator 500 according to an embodiment of the present invention. In the embodiment of FIGS. 5 and 6, the fine rotary head actuator 500 includes an actuator frame 550. The actuator frame 550 includes a fixed portion 552 that is attached to (e.g. adhered to) or is part of the tongue 506 of a laminated flexure 504 of the head suspension assembly 600. The laminated flexure 504 includes a plurality of conductors 518, and a structural layer that is attached (e.g. spot welded) to a load beam 502 of the head suspension assembly 600.

In the embodiment of FIGS. 5 and 6, the actuator frame 550 includes a first actuated portion 570 that has a head mounting surface and is connected to the fixed portion 552 by first compliant member 554. The actuator frame 550 also includes a second actuated portion 572 that has a head mounting surface and is connected to the fixed portion 552 by second compliant member 556. In certain embodiments, each of the first and second compliant members 554, 556 is considered "compliant" if its longitudinal stiffness is substantially less than that of an adjacent piezoelectric element. Each of the first and second compliant members 554, 556 may be curved to enhance its compliance for elongation along its length (for example including one, two, or more semicircular lobes along its length).

In the embodiment of FIGS. 5 and 6, the actuator frame 550 also includes first and second piezoelectric element receiving windows 562, 564, each preferably adjacent and bounded by a respective one of the first and second compliant members 554, 556. In the embodiment of FIGS. 5 and 6, the fine rotary head actuator 500 includes first and second piezoelectric elements 592, 594, each being disposed within a respective one of the first and second piezoelectric element receiving windows 562, 564. A read head 510 is adhered to the mounting surfaces of the actuated portions 570, 572 of the actuator frame 550 by an adhesive material (e.g. conventional epoxy, cyanoacrylate, etc).

Referring again to the embodiment of FIGS. 5 and 6, at least one edge of the first piezoelectric element 592 is bonded by an adhesive to an edge of the actuator frame 550 that faces into the first piezoelectric element receiving window 562. Likewise, at least one edge of the second piezoelectric element 594 is bonded by an adhesive to an edge of the actuator frame 550 that faces into the second piezoelectric element receiving window 564. In certain embodiments, the adhesive used to bond the first and second piezoelectric elements 592, 594 to the actuator frame 550 may be an electrically non-conductive cyanoacrylate, epoxy, polyimide, and/or acrylic. The non-conductivity of such adhesive may be advantageous in certain embodiments where electrode layers of a piezoelectric element might otherwise be shorted, though a conductive adhesive might provide advantageous grounding in certain embodiments where a coating on the piezoelectric element would prevent shorting.

In certain embodiments, a conductive adhesive, solder, ribbon leads, and/or gold wire stitching may be used to make conventional electrical connections to the piezoelectric elements 592, 594. However, if solder is used, then it may be desirable for the solder to have a low temperature melting point, since it may be undesirable for it to get so hot that the piezoelectric material becomes depolarized.

In certain embodiments, a side of each piezoelectric element 592, 594 may be grounded via electrical conduction through the actuator frame and the stainless steel parts of the suspension assembly (used as the ground conductor rather than or in addition to a ground trace of the laminated flexure 504). In certain embodiments, the actuated portions 570, 572 and the fixed portion 552 of the actuator frame 550 are preferably fabricated from a metal material (e.g. stainless steel).

In the embodiment of FIGS. 5 and 6, the fixed portion 552, the actuated portions 570, 572, and the first and second curved compliant members 554, 556, are a single component having material continuity rather than being an assembly of subcomponents. For example, the fixed portion 552, the actuated portions 570, 572 and the first and second curved compliant members 554, 556, may be distinct regions of a single stainless steel sheet, each distinct region being at least partially bounded and defined by etched openings through the single stainless steel sheet. Note that one of ordinary skill can determine whether an opening is an etched opening from the structure alone (e.g. inspection of the edges) without first being told what process was used to create such opening. Hence, the term "etched opening" is properly considered as a structural limitation herein, rather than a merely as a process limitation.

Figure 7:
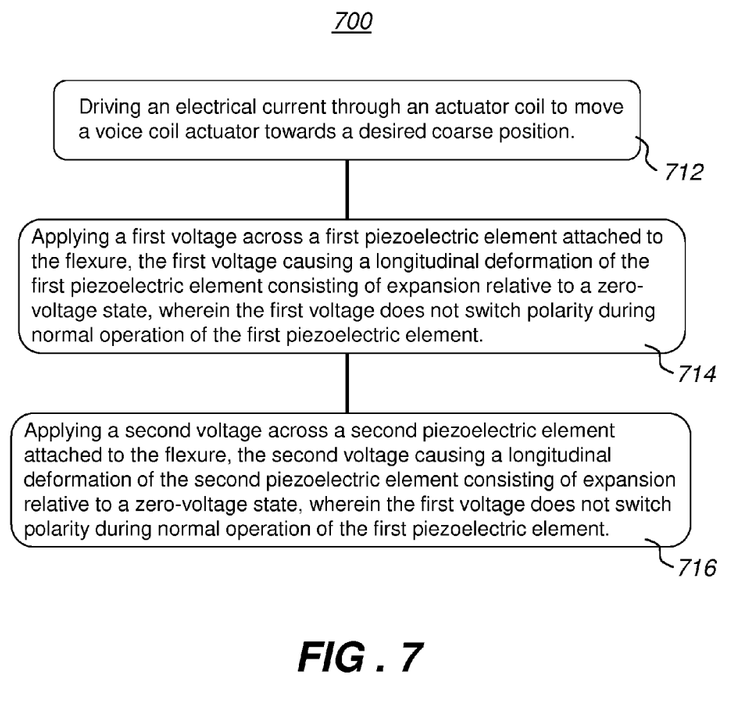
FIG. 7 is a flow chart illustrating method steps of an embodiment of the present invention.

FIG. 7 depicts a flow chart 700 illustrating method steps of an embodiment of the present invention. Now referring additionally to FIG. 7, in step 712 an electrical current is driven through an actuator coil (e.g. actuator coil 111 of FIG. 1) to move the voice coil actuator (e.g. voice coil actuator 110 of FIG. 1) towards a desired coarse position. In step 714 of the embodiment of FIG. 7, a first voltage is applied across a first piezoelectric element (e.g. first piezoelectric element 592 of FIGS. 5 and 6) attached to a flexure 504 via actuator frame 550. Note that in certain embodiments, being attached to the flexure 504 could mean being attached directly to flexure 504, or alternatively in the embodiment of FIGS. 5 and 6, it could mean being attached to a separate actuator frame 550 which is attached to the flexure 504. Note also that in the embodiment of FIG. 7, the steps 712 and 714 are connected by a line rather than by an arrow, because steps 712 and 714 could be done in any sequential order or concurrently.

In the embodiment of FIG. 7, the first voltage applied in step 714 causes a longitudinal deformation of the first piezoelectric element that consists of expansion relative to a zero-voltage state. In this context and as used herein, "longitudinal deformation" is the deformation measured only in the longitudinal direction (e.g. along the long axis of the piezoelectric element). In the case of a rectangular piezoelectric element having a longer longitudinal dimension and a shorter transverse dimension (i.e. a dimension that is transverse to the longitudinal direction), the long axis would be along the direction of the longer longitudinal dimension (e.g. along longitudinal axis 396 or 398 shown in FIG. 3). In the case of a non-rectangular or irregular piezoelectric element, the long axis would be the axis that lies along whatever is its longest dimension. Longitudinal deformation is considered to consist of only expansion herein, so long as the deformation measured in the longitudinal direction consists of expansion—even if there is some concurrent contraction in a transverse direction (e.g. corresponding to the Poisson's ratio of the piezoelectric material). Since the first voltage does not switch polarity during normal operation of the first piezoelectric element in this embodiment, the longitudinal deformation of the first piezoelectric element is never contraction relative to the zero-voltage state.

In step 716 of the embodiment of FIG. 7, a second voltage is applied across a second piezoelectric element (e.g. second piezoelectric element 594 of FIGS. 5 and 6) attached to the laminated flexure 504 via actuator frame 550. Note that each of the first and second voltages may be applied as an electric field (e.g. by applying an electrical potential across conventional electrodes deposited on faces of each piezoelectric element 592, 594 and/or as sub-laminate layers of each piezoelectric element 592, 594). Note that in the embodiment of FIG. 7, the steps 714 and 716 are connected by a line rather than by an arrow, because steps 714 and 716 could be done in any sequential order or concurrently.

In the embodiment of FIG. 7, the second voltage applied in step 716 causes a longitudinal deformation of the second piezoelectric element that consists of expansion relative to a zero-voltage state. Since the second voltage does not switch polarity during normal operation of the second piezoelectric element in this embodiment, the longitudinal deformation of the second piezoelectric element is never contraction relative to the zero-voltage state.

Now referring again to the embodiment of FIGS. 5 and 6, the first piezoelectric element 592 has an anchored end 604 that does not substantially move relative to the tongue 506 of the laminated flexure 504 when the first piezoelectric element 592 is caused to deform. Also in the embodiment of FIGS. 5 and 6, the first piezoelectric element 592 has an actuated end 602 that does not substantially move relative to the head 510 when the first piezoelectric element is caused to deform.

Also in the embodiment of FIGS. 5 and 6, the second piezoelectric element 594 has an anchored end 606 that does not substantially move relative to the tongue 506 of the laminated flexure 504 when the second piezoelectric element 594 is caused to deform. Also in the embodiment of FIGS. 5 and 6, the second piezoelectric element 594 has an actuated end 608 that does not substantially move relative to the head 510 when the second piezoelectric element is caused to deform.

Hence, when steps 714 and 716 of FIG. 7 are applied to the fine rotary head actuator 500 of FIGS. 5 and 6, each of the first and second piezoelectric elements 592, 594 exhibits longitudinal deformation consisting of expansion in the direction and sense shown by the arrows superimposed upon the first and second piezoelectric elements 592, 594 as shown in FIG. 6. Note that in the embodiment of FIGS. 5 and 6, the fine rotary head actuator 500 is attached to the laminated flexure 504 in an orientation such that the anchored end 604 of the first piezoelectric element 592 is disposed closer to the actuator coil (e.g. actuator coil 111 of FIG. 1) than is a centroid of the head 510, and the anchored end 606 of the second piezoelectric element 594 is disposed further from the actuator coil (e.g. actuator coil 111 of FIG. 1) than is the centroid of the head 510. Therefore, in the embodiment of FIGS. 5 and 6, longitudinal expansion of the first and second piezoelectric elements 592, 594 stretches the curved compliant members 554, 556, so that the head 510 is rotated clockwise in the view of FIG. 6, relative to a zero voltages state. In this way, applying the first and second voltages may cause the head 510 to rotate to a desired fine position.

In certain embodiments, the first voltage and the second voltage do not switch polarity during normal operation of the first and second piezoelectric elements 592, 594. For example, the first voltage may be a time varying voltage that fluctuates about a DC bias voltage, with the fluctuation never exceeding a magnitude of the DC bias voltage. Likewise, the second voltage may optionally be a time varying voltage that fluctuates about a DC bias voltage, with the fluctuation never exceeding a magnitude of the DC bias voltage. In certain embodiments, the first voltage applied to the first piezoelectric element 592 and the second voltage applied to the second piezoelectric element 594, are optionally the same voltage. In certain embodiments, the first voltage applied to the first piezoelectric element 592 and the second voltage applied to the second piezoelectric element 594, are never zero during normal operation of the first and second piezoelectric elements 592, 594.

In certain embodiments, the fine rotary actuator 500 may marginally rotate either clockwise or counter clockwise from a nominal clockwise bias, by increasing or decreasing the magnitude of the first and second applied voltages, which never change polarity or sense—e.g. always longitudinally expand the first and second piezoelectric elements 592, 594 relative to a zero voltage state. Both senses of marginal rotation from the bias position are thereby achievable by changing only the magnitude, but not the polarity or sense, of the voltages applied to the first and second piezoelectric elements 592, 594. In such an embodiment, undesired depolarization of the first and second piezoelectric elements 592, 594 may be advantageously reduced or avoided, thereby increasing the lifetime and/or reliability of the disk drive.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:

1. A method to position a head during operation of a disk drive, the head being attached to a flexure of a suspension assembly, the suspension assembly being attached to a voice coil actuator having an actuator coil, the method comprising:
    driving an electrical current through the actuator coil to move the voice coil actuator towards a coarse position;
    applying a first voltage across a first piezoelectric element attached to the flexure, the first voltage causing a longitudinal deformation of the first piezoelectric element consisting of expansion relative to a zero-voltage state;
    applying a second voltage across a second piezoelectric element attached to the flexure, the head being disposed between the first and second piezoelectric elements, the second voltage causing a longitudinal deformation of the second piezoelectric element consisting of expansion relative to a zero-voltage state;
    wherein the first and second voltages do not switch polarity during normal operation of the first and second piezoelectric elements.

2. The method of claim 1 wherein driving the electrical current through the actuator coil torques the voice coil actuator towards a coarse position, and applying the first and second voltages causes the head to rotate to a fine position.

3. The method of claim 1 wherein the suspension assembly is attached to the voice coil actuator by a swage connection.

4. The method of claim 1 wherein the flexure includes a structural layer, a dielectric layer, and a conductive layer that defines a plurality of conductive traces, and wherein the head is electrically connected to more than one of the plurality of conductive traces, and the first and second piezoelectric elements are each electrically connected to at least one of the plurality of conductive traces.

5. A method to position a head during operation of a disk drive, the head being attached to a flexure of a suspension assembly, the suspension assembly being attached to a voice coil actuator having an actuator coil, the method comprising:
  driving an electrical current through the actuator coil to move the voice coil actuator towards a coarse position;
  applying a first voltage across a first piezoelectric element attached to the flexure, the first voltage causing a longitudinal deformation of the first piezoelectric element consisting of expansion relative to a zero-voltage state;
  applying a second voltage across a second piezoelectric element attached to the flexure, the second voltage causing a longitudinal deformation of the second piezoelectric element consisting of expansion relative to a zero-voltage state;
  wherein the first and second voltages do not switch polarity during normal operation of the first and second piezoelectric elements; and
  wherein the first voltage and the second voltage are the same.

6. A method to position a head during operation of a disk drive, the head being attached to a flexure of a suspension assembly, the suspension assembly being attached to a voice coil actuator having an actuator coil, the method comprising:
  driving an electrical current through the actuator coil to move the voice coil actuator towards a coarse position;
  applying a first voltage across a first piezoelectric element attached to the flexure, the first voltage causing a longitudinal deformation of the first piezoelectric element consisting of expansion relative to a zero-voltage state;
  applying a second voltage across a second piezoelectric element attached to the flexure, the second voltage causing a longitudinal deformation of the second piezoelectric element consisting of expansion relative to a zero-voltage state;
  wherein the first and second voltages do not switch polarity during normal operation of the first and second piezoelectric elements; and
  wherein the first voltage and the second voltage are never zero during normal operation of the first and second piezoelectric elements.

7. The method of claim 6 wherein the first voltage is time varying and fluctuates about a DC bias voltage, said fluctuation never exceeding a magnitude of the DC bias voltage.

8. The method of claim 6 wherein the second voltage is time varying and fluctuates about a DC bias voltage, said fluctuation never exceeding the DC bias voltage.

9. A method to position a head during operation of a disk drive, the head being attached to a flexure of a suspension assembly, the suspension assembly being attached to a voice coil actuator having an actuator coil, the method comprising:
  driving an electrical current through the actuator coil to move the voice coil actuator towards a coarse position;
  applying a first voltage across a first piezoelectric element attached to the flexure, the first voltage causing a longitudinal deformation of the first piezoelectric element consisting of expansion relative to a zero-voltage state;
  applying a second voltage across a second piezoelectric element attached to the flexure, the second voltage causing a longitudinal deformation of the second piezoelectric element consisting of expansion relative to a zero-voltage state;
  wherein the first and second voltages do not switch polarity during normal operation of the first and second piezoelectric elements; and
  wherein the first piezoelectric element and the second piezoelectric element are bonded to mounting surfaces of a fine rotary actuator that is attached to a tongue of the flexure.

10. A method to position a head during operation of a disk drive, the head being attached to a flexure of a suspension assembly, the suspension assembly being attached to a voice coil actuator having an actuator coil, the method comprising:
  driving an electrical current through the actuator coil to move the voice coil actuator towards a coarse position;
  applying a first voltage across a first piezoelectric element attached to the flexure, the first voltage causing a longitudinal deformation of the first piezoelectric element consisting of expansion relative to a zero-voltage state;
  applying a second voltage across a second piezoelectric element attached to the flexure, the second voltage causing a longitudinal deformation of the second piezoelectric element consisting of expansion relative to a zero-voltage state;
  wherein the first and second voltages do not switch polarity during normal operation of the first and second piezoelectric elements; and
  wherein the first piezoelectric element and the second piezoelectric element are embedded into windows in a frame of a fine rotary actuator that is attached to a tongue of the flexure.

11. A method to position a head during operation of a disk drive, the head being attached to a flexure of a suspension assembly, the suspension assembly being attached to a voice coil actuator having an actuator coil, the method comprising:
  driving an electrical current through the actuator coil to move the voice coil actuator towards a coarse position;
  applying a first voltage across a first piezoelectric element attached to the flexure, the first voltage causing a longitudinal deformation of the first piezoelectric element consisting of expansion relative to a zero-voltage state;
  applying a second voltage across a second piezoelectric element attached to the flexure, the second voltage causing a longitudinal deformation of the second piezoelectric element consisting of expansion relative to a zero-voltage state;
  wherein the first and second voltages do not switch polarity during normal operation of the first and second piezoelectric elements; and
  wherein each of the first and second piezoelectric elements has an anchored end that does not substantially move relative to a tongue of the flexure when the first and second piezoelectric elements are caused to deform, and an actuated end that does not substantially move relative to the head when the first and second piezoelectric elements are caused to deform, and wherein the anchored end of the first piezoelectric element is disposed closer to the actuator coil than is a centroid of the head, and the anchored end of the second piezoelectric element is disposed further from the actuator coil than is the centroid of the head.

* * * * *